(12) United States Patent
Barberis et al.

(10) Patent No.: US 10,119,181 B2
(45) Date of Patent: Nov. 6, 2018

(54) TREATMENT PROCESS FOR A ZIRCONIUM ALLOY, ZIRCONIUM ALLOY RESULTING FROM THIS PROCESS AND PARTS OF NUCLEAR REACTORS MADE OF THIS ALLOY

(71) Applicant: AREVA NP, Courbevoie (FR)

(72) Inventors: Pierre Barberis, Ugine (FR); Pascal Guerin, Pallud (FR); Pascaline Fremiot, Chambery (FR)

(73) Assignee: AREVA NP, Courbevoie (FR)

( * ) Notice: Subject to any disclaimer, the term of this patent is extended or adjusted under 35 U.S.C. 154(b) by 441 days.

(21) Appl. No.: 14/759,791

(22) PCT Filed: Jan. 11, 2013

(86) PCT No.: PCT/IB2013/001331
§ 371 (c)(1),
(2) Date: Jul. 8, 2015

(87) PCT Pub. No.: WO2014/108720
PCT Pub. Date: Jul. 17, 2014

(65) Prior Publication Data
US 2015/0354030 A1     Dec. 10, 2015

(51) Int. Cl.
*C22C 16/00* (2006.01)
*C22F 1/18* (2006.01)
(Continued)

(52) U.S. Cl.
CPC .............. *C22C 16/00* (2013.01); *C22F 1/186* (2013.01); *G21C 3/07* (2013.01); *G21C 3/30* (2013.01); *G21C 21/00* (2013.01); *Y02E 30/40* (2013.01)

(58) Field of Classification Search
None
See application file for complete search history.

(56) References Cited

U.S. PATENT DOCUMENTS

| 5,254,308 A | 10/1993 | Garde et al. |
| 5,985,211 A | 11/1999 | Jeong et al. |

(Continued)

FOREIGN PATENT DOCUMENTS

| CN | 1399780 A | 2/2003 |
| CN | 101175864 A | 5/2008 |

(Continued)

OTHER PUBLICATIONS

Search Report for corresponding International Application PCT/IB2013/001331.

(Continued)

*Primary Examiner* — Deborah Yee
(74) *Attorney, Agent, or Firm* — Davidson, Davidson & Kappel, LLC

(57) ABSTRACT

A treatment process for a zirconium alloy is provided. The process includes the following steps:
 a zirconium alloy ingot is prepared, the composition of which is:
  $0.40\% \leq Nb \leq 1.05\%$;
  $traces \leq Sn \leq 2\%$;
  $(0.5Nb-0.25)\% \leq Fe \leq 0.50\%$;
  $traces \leq Ni \leq 0.10\%$;
  $traces \leq (Cr+V)\% \leq 0.50\%$;
  $traces \leq S \leq 35$ ppm;
  $600$ ppm $\leq O \leq 2000$ ppm, preferably $1200$ ppm $\leq O \leq 1600$ ppm;
  $traces \leq Si \leq 120$ ppm;
  $traces \leq C \leq 150$ ppm;
 the remaining being Zr and unavoidable impurities;
 the ingot undergoes at least one reheating and hot shaping step, and possibly a reheating and quenching step following a hot shaping step;
 optionally the hot-shaped ingot undergoes an annealing;
(Continued)

the hot-shaped and possibly annealed ingot undergoes at least one cycle of cold rolling-annealing steps;

the annealing of at least one of the cold rolling-annealing steps being performed at a temperature comprised between 600° C. and the lowest of either 700° C. or (710−20×Nb %)° C., and the annealings of the other cold rolling-annealing steps, if any, being performed at a temperature not higher than 600° C. Also provided are a Zr alloy so obtained, and part of a fuel assembly for a light water nuclear reactor made of it.

16 Claims, 3 Drawing Sheets

(51) Int. Cl.
G21C 3/07 (2006.01)
G21C 3/30 (2006.01)
G21C 21/00 (2006.01)

(56) References Cited

U.S. PATENT DOCUMENTS

| | | | |
|---|---|---|---|
| 6,544,361 B1 | 4/2003 | Diz et al. | |
| 6,863,745 B1 | 3/2005 | Charquet et al. | |
| 8,882,939 B2 * | 11/2014 | Barberis | C22C 16/00 148/407 |
| 2005/0205175 A1 | 9/2005 | Charquet | |
| 2006/0081313 A1 | 4/2006 | Barberis et al. | |
| 2006/0225815 A1 | 10/2006 | Garzarolli et al. | |
| 2009/0071579 A1 * | 3/2009 | Hallstadius | C22C 16/00 148/672 |
| 2010/0126636 A1 * | 5/2010 | Barberis | C22C 16/00 148/407 |
| 2011/0002433 A1 | 1/2011 | Hallstadius et al. | |

FOREIGN PATENT DOCUMENTS

| | | | |
|---|---|---|---|
| CN | 101270425 A | 9/2008 | |
| CN | 101285140 A | 10/2008 | |
| CN | 100529148 C | 8/2009 | |
| CN | 101512671 A | 8/2009 | |
| JP | 2001220632 A | 8/2001 | |
| JP | A2003510619 | 3/2003 | |
| JP | 2006265725 A | 10/2006 | |
| JP | A2009513821 | 4/2009 | |
| JP | A2010511165 | 4/2010 | |
| WO | WO200048199 | 8/2000 | |
| WO | WO200124193 | 4/2001 | |
| WO | WO 01/61062 A1 | 8/2001 | |
| WO | WO 2008/071862 | * 6/2008 | C22C 16/00 |

OTHER PUBLICATIONS

Jong Hyuk Baek et al., "Effects of the Accumulated Annealing Parameter on the Corrosion Characteristics of a Zr—0.5Nb—1.0Sn—0.5Fe—0.25Cr Alloy", May 24, 1999, pp. 1-11.

Jong Hyuk Baek et al.,"Corrosion characteristic of a Zr—0.8Sn—0.4Fe—0.2Cr—xNb system with the Variation of the Intermediate Annelaing temperature", Jul. 26, 2002, pp. 1-10.

* cited by examiner

TREATMENT PROCESS FOR A ZIRCONIUM ALLOY, ZIRCONIUM ALLOY RESULTING FROM THIS PROCESS AND PARTS OF NUCLEAR REACTORS MADE OF THIS ALLOY

The present invention relates to the field of zirconium (Zr) alloys used in light water nuclear reactors and their thermo-mechanical treatments, for the making of fuel cladding tubes and structural elements of the fuel assembly of said reactors like guide thimbles, sheets for boxes and spacing grids. The invention may, so, concern long products and flat products as well.

BACKGROUND

To this end, it is known in the art to use Zr alloys which are said to be "ternary" or "quaternary" according to the number of main alloying elements they contain. Ternary alloys contain, in addition to Zr, significant amounts of Nb on the one hand, Fe and possibly Cr and/or V on the other hand. Quaternary alloys contain, in addition, a significant amount of Sn. Other elements than the ones which have been cited may be present, either as mere impurities which, in some instances, must be kept within strict limits through a careful choice of the raw materials from which the alloy is made, or as deliberate additions which, though they may be limited to small amounts, have a significant influence on the mechanical and/or chemical properties of the alloy. Among these elements, Ni, O, C, Si, S can be cited.

These alloys may be used in a stress-relieved condition, i.e. with less than about 10% of recrystallized grains, in a recrystallized condition also named completely or fully recrystallized condition, i.e. with more than about 90% of recrystallized grains or in a partially recrystallized condition, i.e. with about 10% to about 90% of recrystallized grains.

SUMMARY OF THE INVENTION

Known ternary or quaternary alloys have some drawbacks.

In particular, it is difficult to obtain their complete recrystallization at low temperatures (for example at less than 600° C.), so thermal treatments at higher temperatures may be necessary when such recrystallization is wished; but these high temperatures may lead to the formation of a β-Zr phase, which is detrimental to the resistance of the alloy to different types of corrosion by the pressurized (PWR) or the boiling (BWR) water reactor medium: water in liquid or vapour state, lithiated water . . . .

Formation of β-Nb should also be avoided for some applications: e.g. this phase might be detrimental to the resistance to shadow corrosion in BWR reactors. However, high temperature treatments would be useful in order to improve some mechanical properties of the alloy, which are due to an increase of the amount of Nb present in solid solution and not combined in precipitates.

It would be useful to reach within a reasonable time a full recrystallization of the treated material during intermediate annealing(s) performed between hot or cold work sequences, aiming at restoring the formability of the material and allowing further deformation. With the known compositions and corresponding processes, full recrystallization can take several tens of hours at 580° C., which is not compatible with an industrial process.

It would also be useful to increase the size of some kinds of precipitates, in order to improve the resistance to corrosion, particularly in PWR reactors. These precipitates are the hexagonal Laves phases C14 $Zr(Fe, Nb, Cr)_2$, the cubic Laves phases C15 having a similar composition, and the tetragonal Zintl phases $Zr_2(Fe, Ni)$. But the drawbacks of the presence of β-Zr, usually caused by such high temperature treatments, cancel these improvements.

Also, having the possibility to treat these ternary/quaternary alloys at temperatures higher than 600° C. would allow to use processes like short continuous annealings, which would make the thermal treatments shorter and more homogeneous in "time at temperature" (that is the time actually spent by the alloy at a given annealing temperature) than classical batch annealings, and, so, would improve the plant productivity and the product quality, while letting less time to Laves or Zintl phases and β-Nb phases for growing (for example for BWR applications).

An aim of the invention is to provide a treatment process of a Zr alloy which, if combined with a precise alloy composition, allows to overcome these drawbacks, and so to fully beneficiate of the advantages of both the alloy composition and the high temperature thermal treatments.

To this end, the invention provides a treatment process for a zirconium alloy intended to be used in a nuclear reactor, characterized in that it comprises the following steps:

a zirconium alloy ingot is prepared, the composition of which is, in weight % or weight ppm:
- 0.40%≤Nb≤1.05%;
- traces≤Sn≤2%;
- (0.5Nb−0.25) %≤Fe≤0.50%;
- traces≤Ni≤0.10%;
- traces≤(Cr+V) %≤0.50%;
- traces≤S≤35 ppm;
- 600 ppm≤O≤2000 ppm, preferably 1200 ppm≤O≤1600 ppm;
- traces≤Si≤120 ppm;
- traces≤C≤150 ppm;

the remaining being Zr and unavoidable impurities;

the ingot undergoes at least one reheating and hot shaping step, and possibly a reheating and quenching step following a hot shaping step;

optionally the hot-shaped ingot undergoes an annealing;

the hot-shaped and possibly annealed ingot undergoes at least one cycle of cold rolling-annealing steps, the last annealing being a final annealing step which gives the product its final stress-relieved, partially recrystallized or completely recrystallized condition;

the annealing of at least one of the cold rolling-annealing steps being performed at a temperature comprised between 600° C. and the lowest of either 700° C. or (710−20×Nb %)° C., and the annealings of the other cold rolling-annealing steps, if any, being performed at a temperature not higher than 600° C.

Preferably, (0.02+1/3Fe) %≤(Cr+V) %.

Preferably, 0.50%≤Nb≤1.05%, and (0.02+1/3Fe) %≤(Cr+V) %≤(0.2+3/4Fe−1/4Nb) %.

Said treatment may comprise at least two cycles of cold rolling-annealing steps.

The temperatures and durations of the reheating and annealing steps are preferably chosen so that the arithmetic mean size of the precipitates is between 50 and 250 nm.

The invention also provides a zirconium alloy, characterized in that its composition is
- 0.40%≤Nb≤1.05%;
- traces≤Sn≤2%;
- (0.5Nb−0.25) %≤Fe≤0.50%;

traces≤Ni≤0.10%;
traces≤(Cr+V) %≤0.50%;
traces≤S≤35 ppm;
600 ppm≤O≤2000 ppm, preferably 1200 ppm≤O≤1600 ppm;
traces≤Si≤120 ppm;
traces≤C≤150 ppm;
the remaining being Zr and unavoidable impurities;
in that it has undergone treatments comprising at least one hot shaping step and at least one cycle of cold rolling-annealing steps, in that the annealing of at least one of the cold rolling-annealing steps was performed at a temperature comprised between 600° C. and the lowest of either 700° C. or (710−20×Nb %)° C., and the annealings of the other cold rolling-annealing steps, if any, were performed at a temperature not higher than 600° C., and in that its microstructure is deprived of β-Zr phase.

The invention also provides a fuel cladding tube for a fuel assembly for a light water nuclear reactor, characterized in that it is made of such a zirconium alloy.

The invention also provides a guide thimble for a fuel assembly for a pressurized water nuclear reactor, characterized in that it is made of such a zirconium alloy.

The invention also provides, a fuel channel for a fuel assembly for a boiling water nuclear reactor characterized in that it is made of such a zirconium alloy.

The invention also provides a grid for a fuel assembly for a light water nuclear reactor characterized in that it is made of such a zirconium alloy.

The invention also provides a water channel for a fuel assembly for a boiling water nuclear reactor, characterized in that it is made of such a zirconium alloy.

As the reader will have understood, the invention basically provides a combination of a ternary or quaternary Zr alloy composition range, containing, apart from Zr, significant amounts of Nb, Fe (and, possibly, in addition also Cr and/or V) for ternary alloys, and also Sn for quaternary alloys, and of a treatment process of this alloy, which, if combined with said compositions, leads to an alloy having favourable mechanical properties and resistance to corrosion in a nuclear medium, though it has undergone a thermal treatment at a relatively high temperature, that is over 600° C. But an upper limit for this annealing temperature must be determined, in order not to obtain β-Zr, at least in too high amounts.

Other kinds of precipitates may be present in the usual minor contents, like carbides and silicides.

BRIEF SUMMARY OF THE DRAWINGS

The invention will be better understood thanks to the following description, which refers to the following figures.

DETAILED DESCRIPTION

Figure 1:
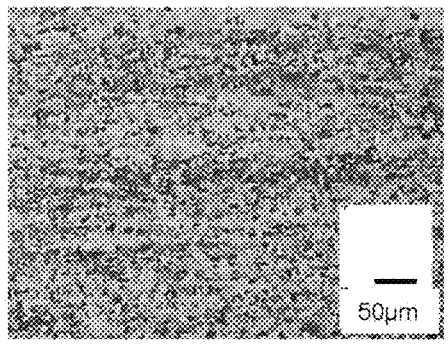
FIGS. 1 to 14, which show the microstructures of samples of reference alloys and of alloys according to embodiments of the invention.

The composition of the Zr alloys of embodiments of the invention is defined and justified as follows. All contents are expressed in weight (wt) % (or in wt ppm).

The Nb content is from 0.40 to 1.05%, boundaries included.

The Fe content is between 0.10 and 0.60%, boundaries included.

Cr and/or V may be present, provided that their sum Cr+V does not exceed 0.50%. Preferably, Cr+V is equal to or higher than (0.02+1/3Fe) %. Most preferably, if Nb is between 0.5 and 1.05%, Cr+V must not exceed (0.2+3/4Fe—Nb/4) %.

These conditions are deemed as necessary or preferred, so that:

on the one hand, during the thermal and thermomechanical treatments of the alloy, precipitation and growth of Laves phases C14 (hexagonal $Zr(Fe, Nb, Cr,)_2$) and C15 (same composition but with a cubic structure) and of tetragonal Zintl phases $Zr_2(Fe, Ni)$ is privileged; generally speaking, these phases are of the type $Zr_xM_y$, with x≤2y and M=one or several metals among Fe, Cr, V, Ni, Nb;

on the other hand, further precipitation of orthorhombic phase $Zr_3(Fe, Ni)$ and cubic phase $(Zr, Nb)_4Fe_2$ is avoided, since these phases, when the thermomechanical treatments begin, are already relatively big, and are detrimental for the ability of the alloy to be shaped.

Also, the Ni content should be limited to 0.1% at most, since over this content, an excessive amount of $Zr_2(Fe, Ni)$ would precipitate. In addition, Ni would cause excessive hydrogen absorption from water in corrosive conditions.

The Sn content is set between an impurity level (for ternary alloys) and 2%. Sn has nearly no influence on the formation and growth of the desired precipitates, and, as it is known in the art, its content is adjusted according to the properties which are intended to be privileged. For contents of 0-0.6%, the corrosion properties are optimized and the alloy is particularly convenient for fuel claddings. For contents of 0.6-2%, the mechanical properties of the alloy are improved, so that it is most convenient for structural elements of the fuel assembly, namely for guide thimbles and water channels.

The O content is between 600 and 2000 ppm, preferably between 1200 and 1600 ppm, as it is classical for obtaining satisfactory mechanical properties for this class of alloys. For similar classical reasons well known in the art, the Si content is not higher than 120 ppm, and the C content is not higher than 150 ppm.

S may be added to the alloy, up to 35 ppm, in order to improve its creep resistance, as it is well known in the art.

Other elements may be present at impurity levels, resulting from the smelting of the raw materials and of the making of the alloy which results into the casting of an ingot.

Concerning the thermomechanical treatments undergone by the alloy from the ingot to the final product, their essential feature for embodiments of the invention is that at least the annealing of the single or of one of the several cold rolling-annealing cycles which is or are performed later than the hot shaping step or steps (at least an extrusion for tubes, at least a hot rolling for sheets, possibly at least a forging for other types of elements) or a reheating and quenching step, such as a beta-quenching, which would follow the hot shaping step or one of the hot shaping steps if several such steps are performed, must be performed at a high temperature, that is a temperature comprised between 600° C. and the lowest of:

either 700° C.;

or (710−20×Nb %)° C.;

and that none of the other annealings belonging to a cold rolling-annealing cycle, which are possibly performed before or after (each of) said high temperature annealing(s), exceeds 600° C., in order to avoid β-Zr precipitation.

The high temperature annealing, which is typical of embodiments of the invention, may be chosen among:
- one or several intermediate annealing(s) performed between two cold rolling steps;
- possibly the final annealing, performed after the last cold rolling step, if one wants to get higher mechanical properties (creep resistance, for example), while accepting some slight degradation of the corrosion resistance.

Optimally, the process comprises at least two cycles of cold rolling-annealing steps, performed after the hot shaping, or after the quenching which possibly follows the hot shaping, or after an annealing following the hot shaping or the quenching which may follow the last hot shaping step. In this optimal process, all annealings belonging to these cold rolling-annealing steps, or only one or some of them, are of the high temperature-type as described above.

It must be understood that the annealing which is possibly performed between the hot shaping and the first cold rolling-annealing cycle may, too, be performed at more than 600° C., and even at a higher temperature than the lowest of 700° C. or (710−20×Nb %)° C., for instance at the temperature of the hot shaping. But, according to embodiments of the invention, at least one of the annealings which will be performed later on must be performed between 600° C. and the lowest of 700° C. or (710−20×Nb %)° C.

A cold rolling must be understood as being a rolling performed between room temperature and 100° C., as it is well known in the art of metallurgy of Zr alloys.

It must be well noticed that the most usually performed final annealing, which gives the product its final stress-relieved or recrystallized (totally or partially) condition, is not the treatment, the lower and upper limits of which have been defined above, in the case where an optimal resistance to corrosion is wished. In that case, this final annealing must not be performed at a high temperature, in order not to increase too much the amount of Nb which is in solid solution. This final annealing may be performed between 470 and 600° C., according to the desired recrystallization rate. Typically, for classical batch annealing processes, this temperature is:
- 500-600° C. during some hours for obtaining a complete recrystallization;
- 450-480° C. during some hours for obtaining a merely stress-relieved condition;
- 470-520° C. during some hours for obtaining a partially recrystallized condition.

It must be understood that these combined temperature and duration limits may vary according to the precise alloy composition and the deformations it has undergone during the forming steps. Also, the temperature and duration of each annealing depend on the annealing process.

Typically, the final annealing duration is lower than said above ones if the annealing is performed in a continuous annealing furnace, and in that case, for the final annealing, a stress-relieved condition may be obtained within the range 560-600° C. with a duration of some minutes to 15 minutes.

It must, so, be understood that the precise final annealing conditions, if this final annealing is not the treatment which aims at obtaining the desired precipitates without β-Zr precipitation, are not a part of embodiments of the present invention, knowing that the person skilled in the art will be able to adjust them according to the desired final structure by routine reflections and experiments.

Said treatment conditions lead to a desirable homogenous distribution of the precipitates.

The arithmetic mean size of the precipitates is preferably between 50 and 250 nm. The arithmetic mean size is defined by the mere average equivalent diameter of the precipitates.

The arithmetic mean size of the precipitates depends on the thermal treatments undergone by the alloy, in particular the temperatures and durations of the reheatings which precede the hot shaping steps and of the temperatures and durations of the annealings which are or may be performed before, between and after the cold rolling steps. The person skilled in the art will easily determine what parameters for these heat treatments are able to lead to the desired size for the precipitates which may differ depending on the nuclear reactor type. The arithmetic mean size of the precipitates is for instance preferably between 50 and 150 nm for a zirconium alloy to be used in a BWR and between 80 and 250 nm for a zirconium alloy to be used in a PWR.

One of the advantages of embodiments of the invention is that, as compared to classical treatments, it helps to tolerate some lack of precision on the real annealing temperatures, which may be somewhat over 600° C., while with treatment processes of ternary/quaternary alloys having the most usual compositions, 600° C. must imperatively not be exceeded. Also, though the annealing temperature may be increased, the choice of the alloy composition according to embodiments of the invention, coupled with the annealing conditions of embodiments of the invention, allows to avoid the detrimental precipitation of β-Zr. It also allows to perform short annealings at relatively high temperatures (such as continuous annealings on running strips from which sheets will be cut) while obtaining the desired recrystallization rate and without risking to precipitate unwished phases. Such short annealing processes allow to obtain simultaneously a good plant productivity and flat products which have a homogenous structure.

Experiments were performed on different alloys, having the compositions cited in table 1.

TABLE 1

Compositions of the tested alloys

| Alloy | Nb % | Sn % | Fe % | Cr % | O ppm | Ni ppm | S ppm |
|---|---|---|---|---|---|---|---|
| 1 (reference) | 1 | 0.5 | 0.35 | 0.25 | 1300 | 700 | 22 |
| 2 (invention) | 0.4 | 0.5 | 0.35 | 0.25 | 1300 | 700 | 22 |
| 3 (invention) | 0.7 | 0.3 | 0.35 | 0.25 | 1300 | Traces | Traces |
| 4 (reference) | 3.1 | Traces | 0.4 | Traces | 1500 | Traces | Traces |
| 5 (invention) | 0.4 | Traces | 0.4 | Traces | 1500 | Traces | Traces |
| 6 (reference) | 1.7 | 1.1 | 0.38 | Traces | 1500 | Traces | Traces |

"Traces" must be understood (as well as in the other parts of this text) as meaning that the presence of the element is assumed to be under the detection limit of the usual analytical means, typically it is less than 10 ppm. So, the element may be absent, or present at a very low content which has no metallurgical effect.

Elements not cited in this table are present at most at trace levels.

These alloys have undergone treatments which will, now, be described.

For quaternary alloys 1 and 2, a reference treatment was performed as follows
- smelting of the alloy, and casting it into a slug weighing about 1.7 kg and being about 50 mm thick;

heating of the slug at 900° C. during 1 hour, and forging it into a slug 22 mm thick;

thermal treatment in the β phase at 1050° C. during 30 min, followed by a cooling in air down to ambient temperature;

machining of the thermally treated slug for giving it a thickness of 16 mm;

heating at 580° C. during 30 min, and hot rolling to a thickness of 6.5 mm; the hot rolled slug is, then, let to cool down to room temperature;

annealing under vacuum at 580° C. during 4 hours, then cooling in vacuum down to ambient temperature;

first cold rolling step to a thickness of 4.5 mm at room temperature;

intermediate annealing under vacuum at 580° C. during 4 hours;

second cold rolling step down to a thickness of 2.7 mm at room temperature;

intermediate annealing under vacuum at 580° C. during 10 hours;

third cold rolling step down to a thickness of 1.5 mm at room temperature;

final annealing under vacuum at 580° C., during 10 hours.

This last step corresponds to the last but one operation of the industrial process. In the industrial process, a final cold rolling is performed to reduce the thickness to about 0.5 mm followed by a final heat treatment to obtain the desired final metallurgical state. The final heat treatment can be done or not according to embodiments of the invention.

For these alloys, treatments according to embodiments of the invention were also performed, with a final annealing at 650° C. during 1 hour or at 675° C. during 4 hours instead of at 580° C. during 10 hours, all other steps and parameters being the same as for the reference treatment.

For quaternary alloy 3, a reference treatment was performed as follows:

smelting of the alloy, and casting into a slug weighing about 1.7 kg and being about 50 mm thick;

heating of the slug at 900° C. during 1 hour, and forging it into a slug 22 mm thick;

thermal treatment in the β phase at 1050° C. during 30 min, followed by a cooling in air down to ambient temperature;

machining of the thermally treated slug for giving it a thickness of 16 mm;

heating at 580° C. during 30 min, and hot rolling to a thickness of 6.5 mm; then, the hot rolled slug is let to cool down to room temperature;

annealing under vacuum at 580° C. during 4 hours; then, cooling in vacuum down to ambient temperature;

first cold rolling step to a thickness of 4.5 mm at room temperature;

intermediate annealing under vacuum at 580° C. during 4 hours;

second cold rolling step down to a thickness of 3.1 mm at room temperature;

intermediate annealing under vacuum at 580° C. during 4 hours;

third cold rolling step down to a thickness of 1.5 mm at room temperature;

final annealing under vacuum at 580° C. during 10 hours.

For this alloy, a treatment according to embodiments of the invention was also performed, with a final annealing at 650° C. during 1 hour instead of 580° C. during 10 hours, all other steps and parameters being the same as for the reference treatment.

Microstructures of some of these alloys so treated, after their final annealing, are shown on FIGS. 1 to 14.

Figure 2:
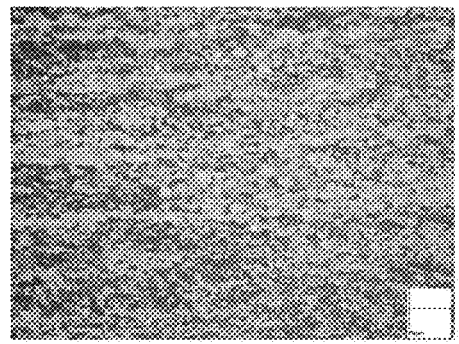

FIG. 1 shows the final microstructure of reference alloy 1, after the reference treatment, i.e. a final annealing performed at 580° C., and FIG. 2 shows the same alloy after the reference treatment during which the final annealing was performed at 650° C.

Reference alloy 1 with final annealing at 580° C., shown on FIG. 1, has numerous duplex stripes. Such a microstructure, which is not desired (because heterogeneous microstructures are not wished, generally speaking, for metal parts, and large grains are not easily deformable during shaping steps), is a succession of stripes formed by either small well recrystallized grains, or by large, badly recrystallized, grains. A possibility, not to obtain such a duplex microstructure would be to increase the annealing temperature, which was done for the experiment which led to the microstructure of FIG. 2. This increase of annealing temperature up to 650° C. allowed to obtain a nearly complete recrystallization, but was not sufficient for completely eliminating the duplex stripes. Some grains with a high dislocation amount can be seen. Precipitate alignments are very few, and may be both intergranular and intragranular.

According to Transmission Electronic Microscopy examinations (not shown), the phases present on the reference alloy 1 annealed at 650° C. are, in a decreasing order:

intermetallic Laves phases $Zr(Fe, Nb, Cr)_2$, mainly cubic, but also hexagonal;

β-Zr;

intermetallic Zintl phase $Zr_2(Fe, Ni)$;

β-Nb.

Figure 3:
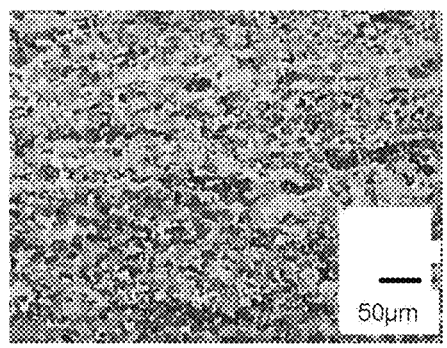
Figure 4:
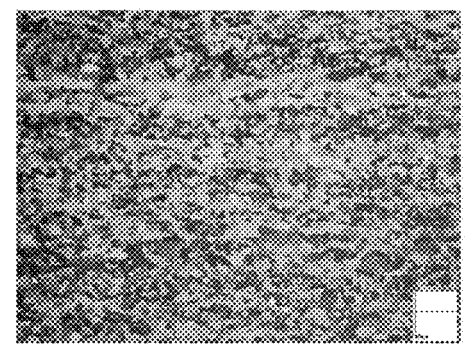

Alloy 2 after a final annealing at 580° C., shown on FIG. 3, has also duplex stripes, but less numerous than in reference alloy 1 annealed at 580° C. The grain size is more consistent, and higher than for reference alloy 1. The recrystallization rate is higher. An explanation of these differences may be the higher amount of Nb in alloy 1, which increases the number of precipitates (but the amount of Nb in solid solution is not very much increased). A final annealing of alloy 2 at 700° C. led to the microstructure shown on FIG. 4. The structure is nearly completely recrystallized. Precipitate alignments are observed, so that their distribution is not sufficiently homogeneous. As said before, a final annealing of alloy 1 at 650° C. led to the microstructure shown on FIG. 2. At this temperature, the structure is already nearly completely recrystallized but with presence of β-Zr phase which is a major drawback.

Transmission Electron Microscopy examinations of the samples (not illustrated) show that the phases present on the alloy 2 annealed at 700° C. are, in a decreasing order:

cubic intermetallic Laves phase $Zr(Fe, Nb, Cr)_2$;

intermetallic phase $Zr_4Fe_2$;

intermetallic Zintl phase $Zr_2(Fe, Ni)$.

Remarkably, no β-Zr (and also no β-Nb) phases are observed, though the final annealing at high temperature was performed at 700° C., and not at 650° C. as for reference alloy 1. So, the changes brought to the alloy composition, as compared to reference alloy 1, led to the main wished result, that is the absence of β-Zr phase. In addition, the distribution of the precipitates is homogeneous enough.

Figure 5:
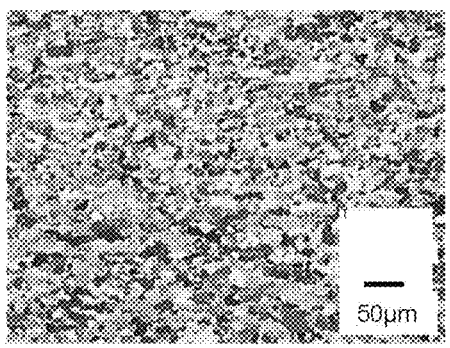
Figure 6:
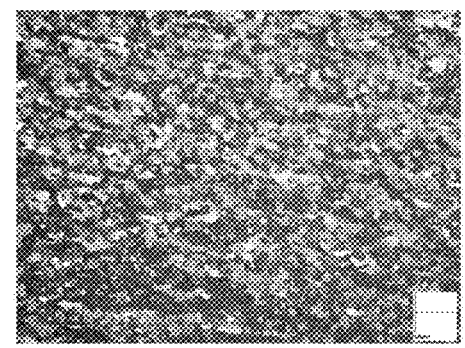
Figure 7:
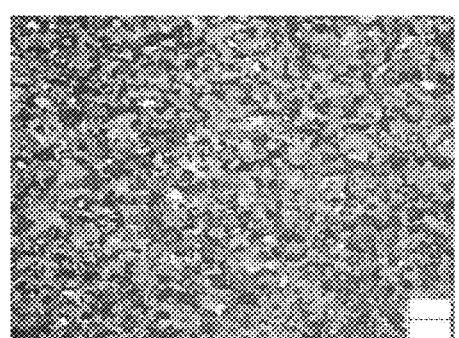

FIG. 5 shows the microstructure of alloy 3, the composition of which is according to embodiments of the invention, but with the reference treatment, i.e. with a final annealing performed at 580° C. during 10 hours, which is a too low temperature for being according to embodiments of the process of the invention. FIG. 6 shows the same alloy after a final annealing performed at 675° C. during 1 hour, and FIG. 7 shows the same alloy after a final annealing performed at 700° C. during 1 hour.

With a final annealing at 580° C. during 10 hours, this alloy is fully recrystallized with intermetallic Laves phases only: no β-Zr (and also no β-Nb) phases are observed. But this satisfactory structure could be obtained only thanks to a long batch annealing treatment, which, in addition, cannot ensure that all the elements of a same batch, treated in industrial conditions, would undergo exactly the same "time at temperature" conditions, independently of their place in the batch (in the core or at the periphery of the batch). So, there is a risk that all the elements of the batch may not have the same structures and properties.

After final annealing at 675° C., this alloy still has grains with high dislocation density, and in some areas, precipitate alignments are observed, while elsewhere the precipitate distribution is homogenous enough. Present phases are hexagonal and cubic intermetallic Laves phase $Zr(Nb, Fe, Cr)_2$.

No β-Zr and β-Nb are observed.

After final annealing at 700° C., this alloy still has a limited amount of grains with high dislocation density, and in some areas, precipitate alignments are observed, while elsewhere the precipitate distribution is homogenous enough. Present phases are hexagonal and cubic intermetallic Laves phase $Zr(Nb, Fe, Cr)_2$ β-Zr can be observed on triple grain boundaries, in an amount which is not excessive, but shows that for the present alloy composition, an annealing temperature of 700° C. is an upper limit which must not be exceeded, at least for an annealing duration of 1 hour.

The possibility, for the alloys of embodiments of the invention, to undergo short annealings at high temperatures without forming detrimental β-Zr gives the possibility to perform these annealings in continuous annealing furnaces, and so to more surely obtain a good homogeneity of the structures and properties of the strips.

For alloys 4, 5 and 6, a reference treatment was performed as follows
  smelting of the alloy, and casting it into a slug weighing about 1.7 kg and being about 50 mm thick;
  heating of the slug at 900° C. during 1 hour, and forging it into a slug 22 mm thick;
  thermal treatment in the β phase at 1050° C. during 30 min, followed by a cooling in air down to ambient temperature;
  machining of the thermally treated slug for giving it a thickness of 16 mm;
  heating at 580° C. during 30 min, and hot rolling to a thickness of 6.5 mm; the hot rolled slug is, then, let to cool down to room temperature;
  annealing under vacuum at 580° C. during 10 hours, then cooling in vacuum down to ambient temperature;
  first cold rolling step to a thickness of 4.5 mm at room temperature;
  intermediate annealing under vacuum at 580° C. during 10 hours;
  second cold rolling step down to a thickness of 2.7 mm at room temperature;
  intermediate annealing under vacuum at 580° C. during 10 hours;
  third cold rolling step down to a thickness of 1.5 mm at room temperature;
  final annealing under vacuum at 580° C. during 20 hours.

For these alloys, treatments according to embodiments of the invention were also performed, with a final annealing at 650, 675 or 700° C. during 1 hour instead of at 580° C. during 20 hours, all other steps and parameters being the same as for the reference treatment.

Figure 8:
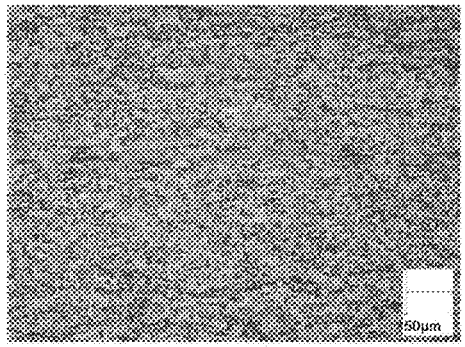

FIG. 8 shows the microstructure of reference alloy 4, the composition of which is not according to the invention, after the reference treatment, i.e. a final annealing at 580° C. during 20 hours, which is a too low temperature for being according to the process of the invention. Indeed, $Zr(Fe, Nb, Cr)_2$ precipitates of the Laves phase are present, but also a significant amount of β-Nb phase.

Figure 9:
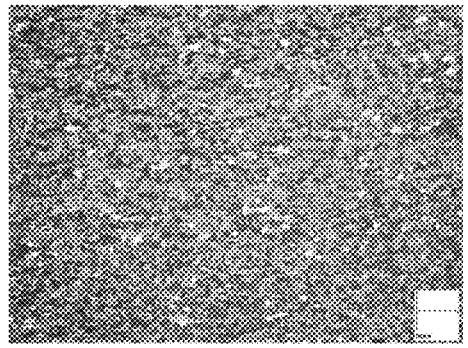

FIG. 9 shows the same alloy after a final annealing performed at 700° C. during 1 hour. The microstructure shows numerous large areas, which are β-Zr and hexagonal intermetallic Laves phase $Zr(Fe, Nb, Cr)_2$. Rounded areas are β-Nb and small intermetallic phases.

A reduction of the final annealing temperature did not allow to obtain an absence of β-Zr. So, it appears that the composition of reference alloy 4 does not allow to reach the goals of embodiments of the invention.

Figure 10:
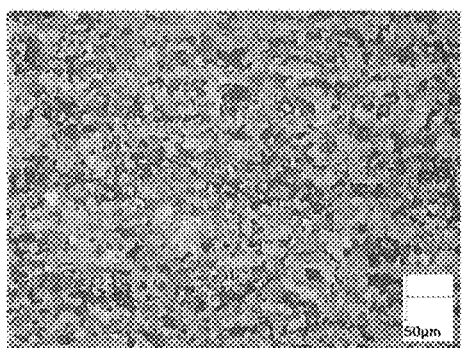
Figure 11:
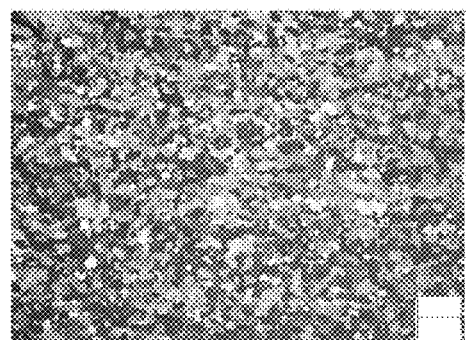
Figure 12:
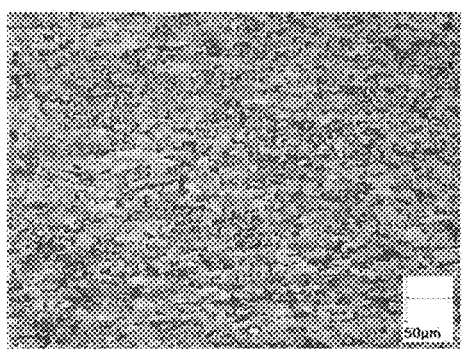

FIG. 10 shows alloy 5, the composition of which is according to an embodiment of the invention, after the reference treatment, i.e. a final annealing performed at 580° C. during 20 hours. FIG. 11 shows the same alloy after a final annealing at 700° C. during 1 hour, and FIG. 12 shows the same alloy after a final annealing at 675° C. during 1 hour.

After the final annealing at 580° C., the alloy contains $Zr_4Fe_2$ precipitates, and no C14 and C15 Laves phases.

After a final annealing at 700° C., essentially intermetallic phase $Zr_4Fe_2$ and β-Zr, 1 µm wide, are observed. This microstructure is, so, not considered as convenient.

But after a final annealing at 675° C., no β-Zr and β-Nb were observed. Globular phases $Zr_4Fe_2$ (about 500 nm wide) and Laves phases $Zr(Fe, Nb, Cr)_2$ (50-100 nm wide) are observed, exclusively in intragranular positions for $Zr_4Fe_2$ and mainly in intergranular positions for Laves phase $Zr(Fe, Nb, Cr)_2$. So, the composition of reference alloy 4, coupled with a convenient annealing temperature, allows to obtain a microstructure deprived of β-Zr and β-Nb, according to an embodiment the invention.

Figure 13:
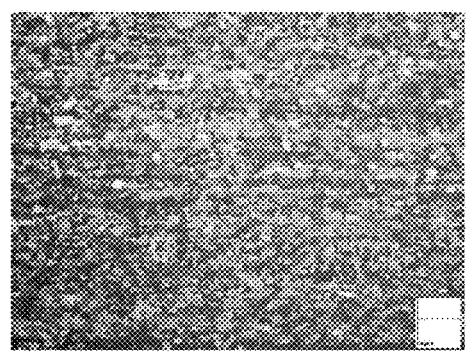
Figure 14:
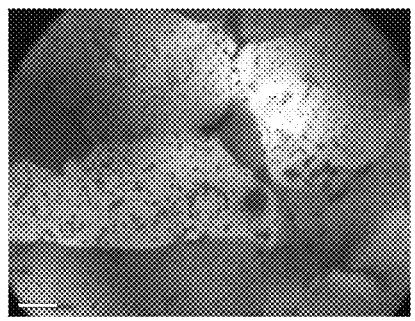

FIG. 13 shows reference alloy 6 after the reference treatment, i.e. a final annealing at 580° C. during 20 hours. FIG. 14 shows the same alloy after a final annealing at 650° C. during 1 hour.

After the annealing at 580° C., the alloy contains intermetallic Laves phase $Zr(Fe, Nb, Cr)_2$ precipitates. Its structure is fully satisfactory but the duration of the treatment is too long.

After the annealing at 700° C., the alloy contains large β-Zr precipitates, and globular phases which are essentially of the hexagonal Laves phase $Zr(Fe, Nb, Cr)_2$ type.

After the annealing at 650° C., the alloy contains mainly intragranular globular Laves phase $Zr(Fe, Nb, Cr)_2$ precipitates 100-200 µm wide, but β-Zr is also significantly present with lengthy intragranular and intergranular precipitates (50×500 nm).

So, the composition of reference alloy 6 does not lead to satisfactory structures, in any of the tested improved annealing conditions.

The arithmetic mean sizes of the desired secondary phase precipitates of the alloys, the composition of which allowed to obtain satisfactory structural results were also compared, for different annealing conditions. The results are shown in table 2.

TABLE 2

Size of the secondary phase precipitates according to the annealing conditions

| | Arithmetic mean size (nm) | | |
|---|---|---|---|
| | Alloy 2 | Alloy 3 | Alloy 5 |
| Annealing 580° C., 20 h | 97.1 | 100.6 | 76.2 |
| Annealing 650° C., 1 h | 98.3 | 108.6 | 87 |
| Annealing 675° C., 4 h | 101.5 | 113.1 | 112.4 |

These sizes are as could be expected. The annealing causes an increase of the precipitate size, which, in the tested conditions is always between about 75 and 115 nm Corrosion tests were performed on some of the samples cited above, as well as on samples of:
- an alloy numbered 7, the composition of which was Zr, 1% Nb, 0.3% Sn, 0.5% Fe, 0.12% Cu, 0.18% V, 1100 ppm O, Ni and S: traces, which had undergone the reference treatment of alloy 3.
- a classical Zr-1% Nb alloy numbered 8, the composition of which was 300 ppm of Fe, 30 ppm of Cr, 22 ppm of S, 1400 ppm of O, 45 ppm of C, V and Si: traces, and which had undergone the following treatment:
  - smelting of the alloy to obtain an industrial ingot (6 tonnes);
  - forging the ingot at 900-750° C.;
  - thermal treatment in the β phase at 1050° C. during 30 min, followed by water quenching;
  - extrusion at 600° C.;
  - 4 pilgering steps to get a cladding tube of 0.72 mm thick and 9.5 mm in diameter with intermediate and final annealings at 550-580° C. for 1 to 2 hours.

Figure 15:
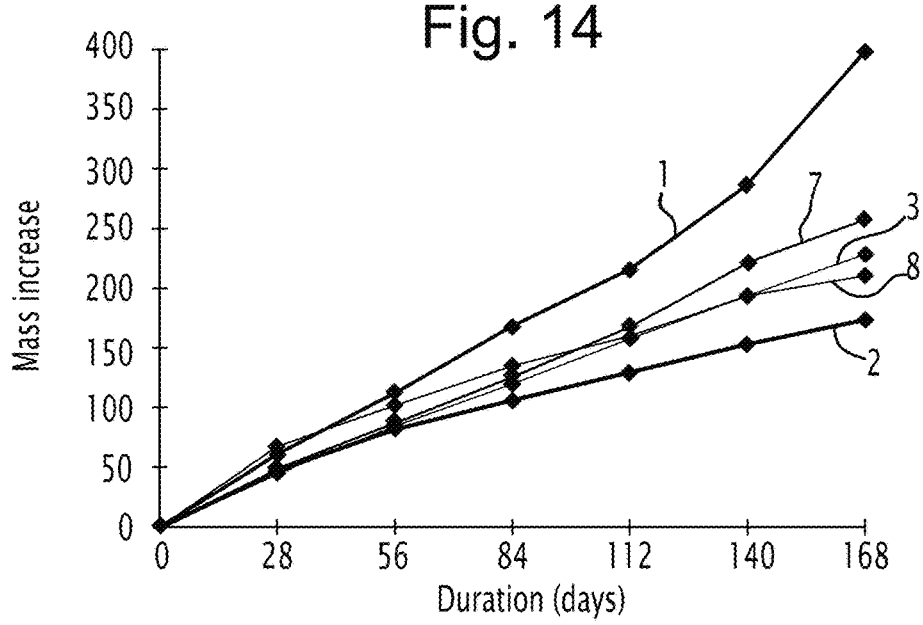
FIGS. 15 and 16 which show the results of corrosion tests performed on reference alloys and alloys according to embodiments of the invention.

The first group of tests, the results of which are shown on FIG. 15, were performed in water vapour at 415° C. during 168 days, on completely recrystallized samples (finally annealed at 580° C. during 20 h), which undergo no annealing at more than 600° C., so were not treated according to the invention.

On FIG. 15, line 1 refers to reference alloy 1, line 2 refers to alloy 2, line 3 refers to alloy 3, line 7 refers to reference alloy 7, and line 8 refers to reference alloy 8.

It appears that, after 168 days, all alloys, except alloy 2 according to an embodiment of the invention, had undergone a higher mass increase, that is a higher corrosion, than reference alloy 8 (Zr-1% Nb). From the beginning reference alloy 1 undergone a higher corrosion than all the other ones and this tendency was confirmed during the whole test. Alloy 3 and reference alloy 7 got corroded somewhat slower than reference alloy 8 during the first 100 days of the test, but their corrosion accelerated afterwards, and after 168 days, they were slightly more corroded than reference alloy 8. Alloy 2 remained less corroded than reference alloy 8 during the whole test. So, it can be deduced that the alloys according to embodiments of the invention have a corrosion behaviour in these test conditions which is not very sensibly worse, or is even better, than the corrosion behaviour of the reference alloy 8 (Zr-1% Nb).

Figure 16:
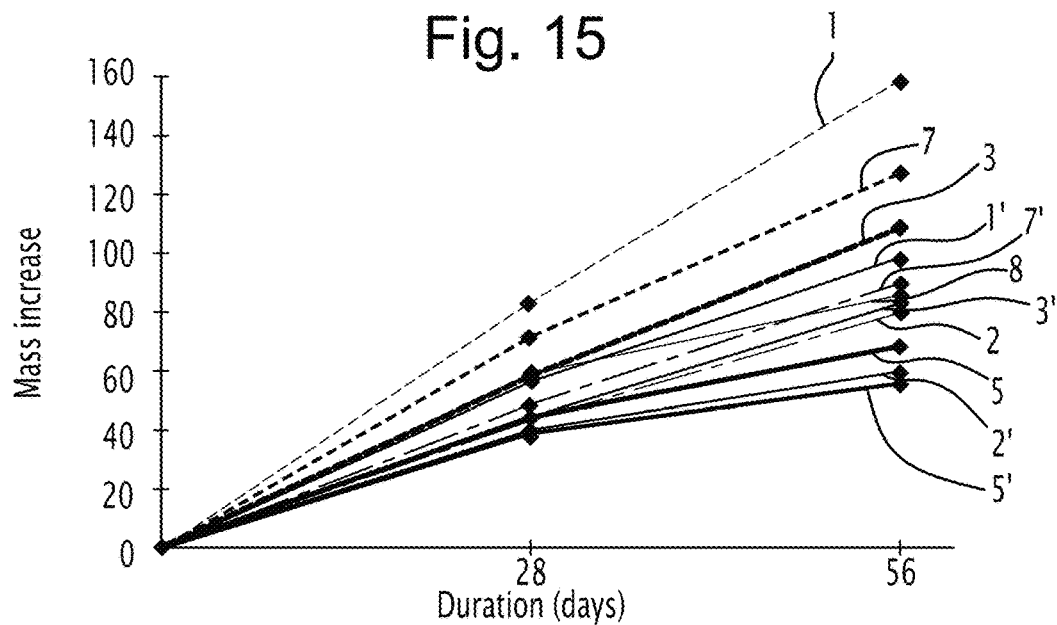

A second group of tests, the results of which are shown on FIG. 16, was performed on the same samples, and also on alloy 5 (according to an embodiment of the invention), but all samples, except for reference alloy 8 (Zr-1% Nb), were tested both in a recrystallized condition and also after a treatment according to embodiments of the invention, with a final annealing treatment at 675° C. during 4 hours.

On FIG. 16, line 1 refers to reference alloy 1 annealed at high temperature, line 1' refers to recrystallized reference alloy 1, line 2 refers to alloy 2 annealed at high temperature, line 2' refers to recrystallized alloy 2, line 3 refers to alloy 3 annealed at high temperature, line 3' refers to recrystallized alloy 3, line 5 refers to alloy 5 annealed at high temperature, line 5' refers to recrystallized alloy 5, line 7 refers to reference alloy 7 annealed at high temperature, line 7' refers to recrystallized alloy 7, line 8 refers to reference alloy 8.

It can be seen on FIG. 16 that:
- generally speaking, the annealings at a relatively high temperature according to embodiments of the invention tend to worsen the resistance to corrosion of all alloys;
- nevertheless, the alloys, the composition of which is according to embodiments of the invention (2, 3, 5) and which were treated according to embodiments of the invention, keep a resistance to corrosion at least acceptable, and sometimes even better, as compared to reference alloy 8 (Zr-1% Nb).

In particular, alloys 2 and 5 behave particularly well.

The differences in corrosion kinetics at 415° C. in water vapour between the alloys which were annealed according to embodiments of the invention and the reference alloys might be explained by an increase of the quantity of Nb in solid solution. This quantity remains acceptable for the alloys according to embodiments of the invention, but it becomes too high for reference alloy 1, the Nb content of which is 1%, that is close to the upper limit of the Nb content (1.05%). But in its case, the Cr content is too high (0.25%), since it exceeds the maximum value for the sum Cr+V which is admitted for Nb content between 0.5 and 1.05% (boundaries included). In the case of reference alloy 1, this maximum value would be 0.21%. The consequence of this excessive amount of Cr is the presence of undesirable β-Zr (and also β-Nb) phase, which downgrades the resistance to corrosion. The increase in corrosion kinetics for reference alloy 7 due to the high temperature annealing, is also considered as being too high. The inventors suggest that the presence of Cu in this alloy generates $Zr_2Cu$ precipitates, similar to $Zr_2Ni$ which are not desired, especially in large amounts. Their presence might be the reason for the worse resistance to corrosion of alloy 7 as compared to the alloys according to embodiments of the invention, which contain Cu at an impurity level (and not more than 0.1% Ni).

The advantages of being able to anneal the alloys at more than 600° C. without forming β-Zr are as follows:
- it becomes possible to reach a complete or nearly complete recrystallization within a relatively short time period, that is between some minutes to 1 hour, while at 580° C., 10 hours or more may be required;
- continuous annealing furnaces can be used for treating running strips, with the possibility to use them for all annealings, and so to strongly improve the productivity of the plant as compared to the use of batch annealing furnaces;
- it becomes easier to adjust the treatment time and temperature in order to obtain a defined size range for the Laves phases, and so to optimize the resistance to corrosion of the alloy for given conditions of use; in particular, the optimal requirements on that point may be different for BWR and PWR reactors;
- the alloys used in embodiments of the invention are less sensitive to actual annealing temperatures which would be slightly different from the wished temperature; a very precise mastering of the annealing conditions is, so, less an essential condition for a good final result than with usual processes.

Among the elements of a nuclear reactor which can be made of a Zr alloy according to embodiments of the invention are the following ones:
- fuel cladding tubes for a fuel assembly for a light water nuclear reactor;
- guide thimbles for a fuel assembly for a pressurized water nuclear reactor;
- fuel channel for a fuel assembly for a boiling water nuclear reactor;
- water channels for a fuel assembly for a boiling water nuclear reactor;
- spacing and mixing grids for a fuel assembly for a light water nuclear reactor.

What is claimed is:

1. A treatment process for a zirconium alloy for use in a nuclear reactor, comprising:
   preparing a zirconium alloy ingot, the zirconium alloy ingot having a composition of which is in weight % or weight ppm:
   0.40%≤Nb≤1.05%;
   traces ≤Sn≤2%;
   (0.5 Nb−0.25) %≤Fe≤0.50%;
   traces ≤Ni≤0.10%;
   traces <(Cr+V) %<0.50%;
   traces ≤S≤35 ppm;
   600 ppm≤O≤2000 ppm;
   traces ≤Si≤120 ppm;
   traces ≤C≤150 ppm;
   If 0.50%≤Nb≤1.05%, then (Cr+V) %≤(0.2 +3/4Fe−1/4Nb) %; and
   the remaining being Zr and unavoidable impurities;
   at least one step of reheating and hot shaping the zirconium alloy ingot;
   at least one cycle of cold rolling-annealing steps on the zirconium alloy ingot after the at least one step of reheating and hot shaping, a last annealing of the at least one cycle of cold rolling-annealing steps being a final annealing step which gives a product formed therefrom a final stress-relieved, partially recrystallized or completely recrystallized condition,
   the annealing of at least one of the cold rolling-annealing steps being performed at a temperature comprised between 650° C. and the lowest of either 700° C. or (710−20×Nb %)° C., and the annealings of the other cold rolling-annealing steps, if any, being performed at a temperature not higher than 600° C.

2. The treatment process as recited in claim 1 wherein the at least one step of reheating and hot shaping the zirconium alloy ingot includes a reheating and quenching step following a hot shaping step.

3. The treatment process as recited in claim 1 further comprising an annealing the ingot after the at least one step of reheating and hot shaping the zirconium alloy ingot.

4. The treatment process as recited in claim 1 wherein (0.02+1/3Fe) %≤(Cr+V) %.

5. The treatment process as recited in claim 1 wherein 0.50%≤Nb≤1.05%, and (0.02+1/3Fe)%≤(Cr+V)%≤(0.2 +3/4Fe−1/4Nb)%.

6. The treatment process as recited in claim 1 wherein the at least one cycle of cold rolling-annealing steps is at least two cycles of cold rolling-annealing.

7. The treatment process as recited in claim 1 wherein the temperatures and durations of the reheating and annealing steps are chosen so that arithmetic mean sizes of the precipitates is between 50 and 250 nm.

8. The treatment process as recited in claim 1 wherein the composition of the prepared zirconium alloy ingot is: 1200 ppm≤O≤1600 ppm.

9. A zirconium alloy having a composition in weight% or weight ppm comprising:
   0. 40%≤Nb≤1.05%;
   traces≤Sn≤2%;
   (0.5 Nb−0.25)%≤Fe≤0.50%;
   traces ≤Ni≤0.10%;
   traces ≤(Cr+V)%≤0.50%;
   traces ≤S≤35 ppm;
   600 ppm≤O≤2000 ppm;
   traces ≤Si≤120 ppm;
   traces ≤C≤150 ppm;
   if 0.50%≤Nb≤1.05%, then (Cr+V)%≤(0.2 +3/4Fe−1/4Nb) %;
   (0.02+1/3Fe)%≤(Cr+V)%; and
   the remaining being Zr and unavoidable impurities;
   wherein the zirconium alloy has undergone treatments comprising at least one hot shaping step and at least one cycle of cold rolling-annealing steps, the annealing of at least one of the cold rolling-annealing steps having been performed at a temperature comprised between 650° C. and the lowest of either 700° C. or (710−20× Nb%)° C., and wherein the annealings of the other cold rolling-annealing steps, if any, having been performed at a temperature not higher than 600° C., and in that its microstructure is deprived of β-Zr phase.

10. The zirconium alloy as recited in claim 9 wherein 1200 ppm ≤O≤1600 ppm.

11. A fuel cladding tube for a fuel assembly for a light water nuclear reactor, the fuel cladding made of the zirconium alloy as recited in claim 9.

12. A guide thimble for a fuel assembly for a pressurized water nuclear reactor, the guide thimble made of the zirconium alloy as recited in claim 9.

13. A fuel channel for a fuel assembly for a boiling water nuclear reactor, the fuel channel made of the zirconium alloy as recited in claim 9.

14. A grid for a fuel assembly for a light water nuclear reactor, wherein the grid made of the zirconium alloy as recited in claim 9.

15. A water channel for a fuel assembly for a boiling water nuclear reactor, wherein the water channel made of the zirconium alloy as recited in claim 9.

16. The treatment process as recited in claim 1 wherein the partially recrystallized or completely recrystallized condition is formed by more than 10% of recrystallized grains.

* * * * *